United States Patent [19]
Morita et al.

[11] Patent Number: 4,694,031
[45] Date of Patent: * Sep. 15, 1987

[54] SURFACE TREATED-GLASS FIBER-REINFORCED POLYPROPYLENE COMPOSITION

[75] Inventors: Hideyo Morita; Tomohiko Akagawa; Yasuo Kita, all of Sakai, Japan

[73] Assignee: Ube Industries, Ltd., Yamaguchi, Japan

[*] Notice: The portion of the term of this patent subsequent to Nov. 4, 2003 has been disclaimed.

[21] Appl. No.: 830,655

[22] Filed: Feb. 18, 1986

[30] Foreign Application Priority Data

Feb. 19, 1985 [JP] Japan ................... 60-029356

[51] Int. Cl.$^4$ .............................. C08K 9/06
[52] U.S. Cl. ..................... 523/203; 523/214; 523/216; 523/217; 524/494; 524/504; 524/505
[58] Field of Search ............... 523/214, 216, 217, 203; 524/505, 504

[56] References Cited

U.S. PATENT DOCUMENTS 4,439,573  3/1984  Fukui et al. ................ 524/451
4,480,065  10/1984 Kawai et al. ................ 524/505
4,621,115  11/1986 Morita et al. ............... 524/504

FOREIGN PATENT DOCUMENTS 0037036  3/1983  Japan ..................... 524/504
59-2294  1/1984  Japan .
0104136  6/1985  Japan ..................... 523/214
2097408  11/1982 United Kingdom .......... 524/505

OTHER PUBLICATIONS

Derwent Abstract 84-014323/03 (J58206659) 1984, Ube Indust.
Derwent Abstract 83-780672/40 (J58145750) 1983, Ube Indust.

Primary Examiner—Herbert J. Lilling
Attorney, Agent, or Firm—Burgess, Ryan and Wayne

[57] ABSTRACT

Disclosed is a glass fiber-reinforced composition, which comprises (A) 99–40 wt. % of a modified ethylene/propylene block copolymer having a polar monomer content of at least 0.05 wt. %, which is obtained by graft-modifying at least partially a crystalline ethylene/propylene block copolymer, in which the ethylene content is 3–15 wt. %, the melt flow rate is 0.1 to 70 g/10 min, the intrinsic viscosity of the portion soluble in p-xylene at normal temperature is 2.5–6 as measured in decalin at 135° C. and the ethylene content of the portion insoluble in p-xylene at normal temperature is 1.5–10 wt. %, with a polar monomer and an organic peroxide in an extruder, (B) up to 20 wt. % of a polyolefin rubber, and (C) 1 to 45 wt. % of a surface-treated glass fiber. This composition gives a molded article having an excellent rigidity and impact resistance.

8 Claims, No Drawings

SURFACE TREATED-GLASS FIBER-REINFORCED POLYPROPYLENE COMPOSITION

BACKGROUND OF THE INVENTION (1) Field of the Invention

The present invention relates to a glass fiber-reinforced polypropylene composition which gives a molded article having excellent rigidity and impact resistance.

(2) Description of the Related Art

Polypropylene has ekcellent physical and chemical properties and is widely used for electric appliances, construction materials, automobile parts, and parts of various machines.

In fields where high rigidity is required, various fillers are incorporated into polypropylene, and in fields where an especially high rigidity is necessary, glass fiber-reinforced polypropylene is used.

Glass fiber-reinforced polypropylene is unsatisfactory in touch and appearance because the glass fiber rises on the surface of a molded article, the gloss of the surface is poor, and the surface is rough and gritty. Further, the impact resistance is low, and accordingly, the commercial value is low.

To improve the physical properties of glass fiber-reinforced polypropylene, a resin composition has been proposed wherein polypropylene grafted with maleic anhydride is substituted for the polypropylene (see Japanese Examined Patent Publication No. 51-10265). This resin composition, however, has a low impact resistance and accordingly, the commercial value is low.

Accordingly, to improve the impact resistance of a molded article of glass fiber-reinforced polypropylene, a composition has been proposed in which a linear amorphous rubbery polymer is incorporated into polypropylene (see Japanese Examined Patent Publication No. 59-2294). This composition comprises 40 to 85 parts by weight of crystalline polypropylene grafted with a polar vinyl monomer or other crystalline polyolefin, 5 to 50 parts by weight of a glass fiber, and 5 to 35 parts by weight of a linear amorphous rubbery elastomer. However, this composition is not preferred from the practical viewpoint because the composition has a poor impact resistance, especially a drop weight impact strength which is an important factor in practice.

SUMMARY OF THE INVENTION

It is a primary object of the present invention to solve the above-mentioned problems involved in the conventional glass fiber-reinforced polypropylene compositions and provide a composition that can give a glass fiber-reinforced polypropylene molded article having high rigidity and high impact resistance, especially a high drop weight impact resistance.

More specifically, in accordance with the present invention, there is provided a glass fiber-reinforced polypropylene composition, which comprises, based on the total weight of the composition, (A) 99 to 40% by weight of a modified ethylene/propylene block copolymer having a polar monomer content of at least 0.05% by weight, which is obtained by graft-modifying at least a part of a crystalline ethylene/propylene block copolymer, in which the ethylene content is 3 to 15% by weight, the melt flow rate is 0.1 to 70 g/10 min, the intrinsic viscosity of the portion soluble in p-xylene at normal temperature is 2.5 to 6 as measured in decalin at 135° C. (the same will apply hereinafter) and the ethylene content of the portion insoluble in p-xylene at normal temperature is 1.5 to 10% by weight, with a polar monomer and an organic peroxide in an extruder, (B) up to 20% by weight of a polyolefin rubber, and (C) 1 to 45% by weight of a surface-treated glass fiber.

DESCRIPTION OF THE PREFERRED EMBODIMENTS

According to the present invention, since graft modification can be carried out in an extruder even though a crystalline ethylene/propylene block copolymer is used in substitution for polypropylene, a polypropylene composition having an excellent rigidity and impact resistance can be obtained by a simple operation.

In the present invention, a modified ethylene/propylene block copolymer which is at least partially graft-modified with a polar monomer and has a polar monomer content of at least 0.05% by weight is used in substitution for the polypropylene. The polyolefin used in the present invention for obtaining the modified ethylene/propylene block copolymer is a crystalline ethylene/propylene block copolymer in which the ethylene content is 3 to 15% by weight, the melt flow rate (MFR) is 0.1 to 70 g/10 min, preferably 0.3 to 20 g/10 min (ASTM D-1238, 230° C., 2160 g), the intrinsic viscosity of the portion soluble in p-xylene at normal temperature (preferably in an amount of 5 to 25% by weight) is 2.5 to 6, preferably 3 to 5, and the ethylene content of the portion insoluble in p-xylene at normal temperature (preferably in an amount of 75 to 95% by weight) is 1.5 to 10% by weight, preferably 3 to 7% by weight. If the total ethylene content or the ethylene content of the portion insoluble in p-xylene at normal temperature is too low and below the above-mentioned range, the impact resistance of the obtained composition is low. In contrast, if the ethylene content exceeds the upper limit, the ethylene component is crosslinked during the graft modification carried out in an extruder, and the impact resistance is reduced and the appearance of the molded article degraded. If the intrinsic viscosity of the portion soluble in p-xylene at normal temperature is lower than the lower limit, the impact resistance of the composition is low. In contrast, if this intrinsic viscosity is higher than the upper limit, crosslinking is readily caused in an extruder and the impact resistance of the obtained composition is reduced. It is difficult to prepare polypropylene having an MFR lower than the above-mentioned lower limit, and if the MFR exceeds the upper limit, pelletization after the graft modification in an extruder is difficult and handling is not easy.

The crystalline ethylene/propylene block copolymer is graft-modified by melt-mixing the copolymer with a polar monomer and an organic peroxide in an extruder, preferably at 175° to 280° C. for about 1 to about 20 minutes.

The polar monomer is not particularly critical. Unsaturated carboxylic acids and their functional derivatives, such as itaconic anhydride, maleic anhydride, acrylic acid and derivatives thereof can be mentioned. Of these, itaconic anhydride is preferred.

The organic peroxide is not particularly critical. An organic peroxide in which the decomposition temperature giving a half value period of 1 minute is not lower than the melting point of the crystalline ethylene/propylene block copolymer used and not higher than 220° C. is preferred. For example, there can be mentioned t-butyl peroxybenzoate, cyclohexanone peroxide, 2,5- dimethyl-2,5-di(benzoylperoxy)hexane, t-butyl peroxyacetate, methyl ethyl ketone peroxide, dicumyl peroxide and 2,5-dimethyl-2,5-di(t-butylperoxy)hexane.

Preferably, the graft polymerization can be accomplished by mixing 100 parts by weight of the crystalline ethylene/propylene block copolymer with 0.05 to 3 parts by weight of the polar monomer and 0.002 to 1 part by weight of the organic peroxide and melt-kneading the mixture in nitrogen or air. It is preferred that pelletization be carried out after the graft modification in the extruder. The resultant graft-modified ethylene/propylene block copolymer may be used as it is or after it has been mixed with the above-mentioned unmodified ethylene/propylene block copolymer so that the polar monomer content in the mixture is at least 0.05% by weight, preferably 0.05 to 1% by weight. It is preferred that the MFR of the thus-obtained modified ethylene/propylene block copolymer be 1 to 150 g/10 min.

In the present invention, a polyolefin rubber may be incorporated. As the polyolefin rubber, there can be preferably used an ethylene/propylene copolymer rubber (EPR) having an ethylene content of about 30 to about 80% by weight, an ethylene/propylene/nonconjugated diene copolymer rubber (EPDM), and an ethylene/butene- 1 copolymer rubber. Of these, the ethylene/propylene copolymer rubber is most preferable. The polyolefin rubber may be graft-modified with a polar monomer as mentioned above. The method for introducing the polar monomer by graft modification is not particularly critical. For example, the introduction can be accomplished according to a solution method or heat-kneading method using a radical initiator such as an organic peroxide as mentioned above. It is preferred that the polar monomer be grafted to the polyolefin rubber for the modification in an amount of 0.05 to 3.5% by weight. After the graft modification, the graft-modified polyolefin rubber can be recovered according to known procedures. It is preferred that the $ML_{1+4}$ value (100° C.) of the graft-modified polyolefin rubber be in the range of from 10 to 100.

In the present invention, a surface-treated glass fiber is used. The shape or length of the glass fiber is not particularly critical. A chopped strand having a diameter of 3 to 30μ and a length of 2 to 10 mm, or a roving, may be used. As the surface-treating agent used for the surface treatment, there can be mentioned vinyltriethoxysilane, vinyltris($\beta$-methoxyethoxy)silane, $\gamma$-methacryloxypropyltrimethoxysilane, $\gamma$-glycidoxypropyltrimethoxysilane, n-(dimethoxymethylsilylpropyl)ethylenediamine, n-(triemthoxysilylpropyl)ethylenediamine, $\gamma$-aminopropyltriethoxysilane and $\gamma$-aminopropyltrimethoxysilane. It is preferred that the amount of the surface-treating agent be 0.05 to 3% by weight. A commercially available surface-treated glass fiber may be used as it is.

The mixing ratios of the respective components in the glass fiber-reinforced polypropylene composition are such that the amount of the modified ethylene/propylene block copolymer (A) is 99 to 40% by weight, preferably 85 to 50% by weight, the amount of the polyolefin rubber (B) is up to 20% by weight, preferably 3 to 20% by weight, and the amount of the surface-treated glass fiber (C) is 1 to 45% by weight, preferably 5 to 45% by weight, more preferably 10 to 30% by weight. If the amount of the glass fiber is smaller than the lower limit, the reinforcing effect is low and the heat distortion temperature and rigidity of the molded article are reduced. If the amount of the glass fiber is larger than the upper limit, the flowability of the composition is reduced and the appearance of the molded article is degraded. If the amount of the polyolefin rubber exceeds the upper limit, the heat distortion temperature and rigidity of the molded article are reduced.

Known additives may be added to the glass fiber-reinforced polypropylene composition of the present invention. For example, there may be added pigments, antioxidants, ultraviolet absorbers, flame retardants, antistatic agents, lubricants, nucleating agents, organic and inorganic fillers such as talc, calcium carbonate, mica, barium sulfate, (calcined) kaolin, silica, magnesium silicate, zeolite, carbon fiber, aromatic polyamide fiber, potassium titanate fiber, asbestos fiber, metal fiber, and boron fiber, and other thermoplastic resins such as nylon, polyester and polycarbonate, in so far as there is no adverse influence on the physical properties of the glass fiber-reinforced polypropylene composition. The amounts of these additives are appropriately determined based on the results of experiments.

In the case where the glass fiber is a chopped strand, the glass fiber-reinforced polypropylene composition of the present invention can be prepared by kneading the above-mentioned components by an extruder, a Banbury mixer, an intensive mixer or the like. When the polyolefin rubber is used, the composition is preferably obtained by melt-kneading the graft-modified crystalline ethylene/propylene block copolymer (optionally together with the unmodified crystalline ethylene/propylene block copolymer) and the polyolefin rubber by a twin-screw extruder and kneading the obtained molten polymer mixture with the glass fiber by a single screw extruder. According to this method, breaking of the glass fiber is controlled and good results are obtained.

The glass fiber-reinforced polypropylene composition of the present invention can be used in fields where a high rigidity and impact resistance are required, for example, for automobile parts, electric appliances, construction materials, and industrial parts.

The present invention will now be described in detail with reference to the following examples and comparative examples. In these examples, all of "parts" and "%" are by weight.

In the examples, the ethylene content in the polymer was determined by the infrared spectrophotometry. With respect to injection-molded test pieces, the tensile strength was determined according to ASTM D-638, the flexural modulus was determined according to ASTM D-790, the heat distortion temperature was determined according to ASTM D-648 (at 18.6 kg/cm$^2$), and the Izod impact strength (notched) was determined according to D-256 (at 23° C.). The appearance of the molded article was evaluated based on the gloss and surface roughness and on whether or not the glass fiber rose on the surface; the mark "A" indicates a good appearance, mark "B" indicates a slightly bad appearance, and mark "C" indicates a bad appearance.

EXAMPLE 1 AND COMPARATIVE EXAMPLES 1 THROUGH 4

In a tumbler, 100 parts of a crystalline ethylene/propylene block copolymer or crystalline propylene homopolymer shown in Table 1 was homogeneously mixed with 0.5 part of itaconic anhydride and 0.15 part of t-butyl peroxybenzoate, and the graft modification was carried out at a temperature of 200° C. in a single screw extruder having a diameter of 65 mm for a residence time of 2 minutes, followed by pelletization, to obtain graft-modified polypropylene (the grafting ratio was 0.36% in Example 1).

In a tumbler, 80 parts of this graft-modified polypropylene was mixed with 20 parts of a glass fiber having a diameter of 10 μm and a length of 6 mm, treated with 0.1% of aminosilane, and by using a single screw extruder having a diameter of 65 mm, and the mixture was kneaded at a temperature of 220° C. for a residence time of 2 minutes, followed by pelletization, to obtain a pellet of a glass fiber-reinforced polypropylene composition having a diameter of 3 mm and a length of 5 mm.

A test piece obtained by injection-molding this pellet was evaluated. The obtained results are shown in Table 1.

strength was 590 kg/cm², the flexural modulus was 30,000 kg/cm², the heat distortion temperature was 136° C., the Izod impact strength was 25 kg.cm, the H.S.I value was 200 kg.cm, the appearance of the molded article was good, and the general evaluation was good (A).

EXAMPLES 3 AND 4 AND COMPARATIVE EXAMPLE 5

A box-shaped molded article having a length of 500 mm, a width of 150 mm, and a height of 200 mm was prepared from the glass fiber-reinforced polypropylene (pellet) obtained in Example 1 (Example 3), Example 2 (Example 4), or Comparative Example 1 (Comparative

TABLE 1

|  |  | Example 1 | Comparative Example 1 | Comparative Example 2 | Comparative Example 3 | Comparative Example 4 |
|---|---|---|---|---|---|---|
| Crystalline polypropylene | MFR (g/10 min) | 2 | 2 | 2 | 2 | 2 |
|  | Ethylene content (%) | 6.0 | 9.6 | 15.6 | 2.5 | 0 |
|  | Intrinsic viscosity of portion soluble in p-xylene at normal temperature | 4.0*1 | 10.7 | 3.2 | 2.7 | — |
|  | Ethylene content in portion insoluble in p-xylene at normal temperature (%) | 4.3 | 7.6 | 14.6 | 1.3 | — |
| Physical properties | Tensile strength (kg/cm²) | 640 | 600 | 580 | 650 | 880 |
|  | Flexural modulus (kg/cm²) | 33,000 | 30,000 | 28,000 | 33,000 | 38,000 |
|  | Heat distortion temperature (°C.) | 141 | 136 | 135 | 143 | 153 |
|  | Izod impact strength (kg · cm/cm) | 15 | 12 | 9 | 8 | 9 |
|  | H.S.I.*² (kg · cm) | 110 | 60 | 40 | 10 | 0 |
| Appearance of molded article |  | A | B | C | A | A |
| General evaluation |  | A | C | C | C | C |

Note
[1] The proportion of the portion soluble in p-xylene at normal temperature was 9%.
[2] The H.S.I. value was determined according to the Ube method (falling missile impact strength, which is a kind of drop weight impact strength). The value indicates the energy required for breaking the test piece when a missile having a top end diameter of 1 inch was caused to impact at a speed of 2.5 m/sec on the test piece, which was an injection-molded disk having a thickness of 3 mm and a diameter of 100 mm.

Note (1) The proportion of the portion soluble in p-xylene at normal temperature was 9%.

(2) The H.S.I value was determined according to the Ube method (falling missile impact strength, which is a kind of drop weight impact strength). The value indicates the energy required for breaking the test piece when a missile having a top end diameter of 1 inch was caused to impact at a speed of 2.5 m/sec on the test piece, which was an injection-molded disk having a thickness of 3 mm and a diameter of 100 mm.

EXAMPLE 2

A glass fiber-reinforced polypropylene composition (pelletized) was obtained from 70 parts of the graft-modified polypropylene obtained in Example 1, 10 parts of graft-modified EPR (ethylene content=75%, Mooney viscosity $ML_{1+4}$ (100° C.)=80, maleic anhydride grafting ratio=1%) obtained by carrying out graft modification at 135° C. for 4 hours with dicumyl peroxide as the catalyst in o-dichlorobenzene, 20 parts of the same glass fiber as used in Example 1, 0.2 PHR (based on polypropylene) of Irganox 1010 (trademark, hindered phenol antioxidant) and 0.1 PHR (based on polypropylene) of BHT by using a continuous two-stage extruder. In the first stage of the extruder, mixing of the polymer components was carried out by using a twin screw extruder at 200° to 240° C., and, in the second stage of the extuder, mixing of the polymer mixture with glass fiber was carried out by using a 65 mm-diameter single screw extruder while a glass fiber is supplied from feed portion of the single screw extruder, at a mixing temperature of 200° to 280° C.

The composition was evaluated in the same manner as described in Example 1. It was found that the tensile Example 5) by using an injection molding machine (Model UBE MAX 415-50 supplied by Ube Industries).

With respect to each injection-molded article, 10 test pieces were tested in the following manner. Namely, a steel ball having a weight of 1 kg was allowed to fall from a height of 1 m onto the surface of the sample at −10° C. The number of the samples where cracking or breaking occurred was checked. In Example 3, no sample was cracked or broken, and in Example 4 no sample was cracked or broken, but 10 samples were cracked or broken in Comparative Example 5.

As is apparent from the foregoing description, a glass fiber-reinforced polypropylene composition having an excellent rigidity and impact strength can be obtained by a simple operation according to the present invention.

We claim:

1. A glass fiber-reinforced polypropylene composition, which comprises, based on the total weight of the composition:
   (A) 99 to 40% by weight of a modified ethylene/propylene block copolymer having an itaconic anhydride content of at least 0.5% by weight, which is obtained by graft-modifying at least a part of a crystalline ethylene/propylene block copolymer, in which the ethylene content is 3 to 15% by weight, the melt flow rate is 0.1 to 70 g/10 min., the intrinsic viscosity of the portion soluble in p-xylene at normal temperature is 2.5 to 6 as measured in decalin at 135°C. and the ethylene content of the portion insoluble in p-xylene at normal temperature is 1.5 to 10% by weight, with itaconic anhydride and an organic peroxide in an extruder,
   (B) 0 to 20% by weight of a polyolefin rubber, and (C) 1 to 45% by weight of a surface-treated glass fiber.

2. A composition as set forth in claim 1, wherein in the crystalline ethylene/propylene block copolymer, the proportion of the portion soluble in p-xylene at normal temperature is 5 to 25% by weight and the proportion of the portion insoluble in p-xylene at normal temperature is 75 to 95% by weight.

3. A composition as set forth in claim 1, wherein the crystalline ethylene/propylene block copolymer has a melt flow rate of 0.3 to 20 g/10 minutes, and the portion of the copolymer soluble in p-xylene at normal temperature has a intrinsic viscosity of 3 to 5.

4. A composition as set forth in claim 1, wherein the organic peroxide has a decomposition temperature such that the half value period of 1 minute is not lower than the melting point of the crystalline ethylene/propylene block copolymer and not higher than 200°C.

5. A composition as set forth in claim 1, wherein the polyolefin rubber is one that is at least partially modified with a polar monomer.

6. A composition as set forth in claim 1, wherein the composition further comprises an unmodified crystalline ethylene/propylene block copolymer in an amount such that the itaconic anhydride content in the sum of the unmodified crystalline ethylene/propylene block copolymer and the modified ethylene/propylene block copolymer is at least 0.5% by weight.

7. A composition as set forth in claim 1, wherein the modified ethylene/propylene block copolymer has a melt flow rate of 1 to 150 g/10 min.

8. A composition as set forth in claim 1, wherein the polyolefin rubber is an ethylene propylene copolymer rubber having an ethylene content of about 30 to about 80% by weight.

* * * * *